United States Patent [19]

Gergen

[11] Patent Number: 4,900,789
[45] Date of Patent: Feb. 13, 1990

[54] POLYMER BLEND OF CARBON MONOXIDE/OLEFIN COPOLYMER AND CONJUGATED ALKADIENE

[75] Inventor: William P. Gergen, Houston, Tex.
[73] Assignee: Shell Oil Company, Houston, Tex.
[21] Appl. No.: 288,367
[22] Filed: Dec. 22, 1988
[51] Int. Cl.⁴ .......................... C08F 1/58; C08G 67/02
[52] U.S. Cl. ..................................... 525/185; 525/539
[58] Field of Search ................ 528/392; 525/313, 529, 525/185, 539

[56] References Cited

U.S. PATENT DOCUMENTS

| | | | |
|---|---|---|---|
| 2,495,286 | 1/1950 | Brubaker | 528/392 |
| 3,264,272 | 8/1966 | Rees | 428/36.9 |
| 3,325,458 | 6/1967 | Kim et al. | 526/193 |
| 3,336,276 | 8/1967 | Kim et al. | 526/193 |
| 3,404,134 | 10/1968 | Rees | 525/362 |
| 3,426,102 | 2/1969 | Solak et al. | 525/310 |
| 3,451,538 | 6/1969 | Trementozzi | 206/439 |
| 3,538,194 | 11/1970 | Barrett et al. | 525/313 |
| 3,540,577 | 11/1970 | Trementozzi et al. | 525/310 |
| 3,580,974 | 5/1971 | Lee et al. | 525/76 |
| 3,586,737 | 6/1971 | Duke et al. | 525/310 |
| 3,634,547 | 1/1972 | Rose et al. | 525/72 |
| 3,652,731 | 3/1972 | Coffey et al. | 525/296 |
| 3,671,607 | 6/1972 | Lee | 525/84 |
| 3,694,412 | 9/1972 | Nozaki | 528/392 |
| 3,951,932 | 4/1976 | Coffey | 526/85 |
| 4,287,318 | 9/1981 | Bracke et al. | 525/313 |

FOREIGN PATENT DOCUMENTS

| | | |
|---|---|---|
| 121965 | 10/1984 | European Pat. Off. . |
| 181014 | 5/1986 | European Pat. Off. . |
| 1081304 | 8/1967 | United Kingdom . |

Primary Examiner—Harold D. Anderson
Assistant Examiner—T. Mosley
Attorney, Agent, or Firm—Dean F. Vance

[57] ABSTRACT

Polymer blends of improved properties are produced with a continuous or partially continuous phase of a linear alternating polymer of carbon monoxide and at least one ethylenically unsaturated hydrocarbon, and a dispersed or partially continuous phase of a polymer of an alkenyl nitrile, a vinyl aromatic monomer, and an alkadiene.

10 Claims, No Drawings

POLYMER BLEND OF CARBON MONOXIDE/OLEFIN COPOLYMER AND CONJUGATED ALKADIENE

FIELD OF THE INVENTION

This invention relates to improved polymer blends comprising a major proportion of a linear alternating polymer of carbon monoxide and at least one ethylenically unsaturated hydrocarbon. More particularly, it relates to blends of the linear alternating polymer with certain alkenylnitrile/alkadiene/vinyl aromatic polymers.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. 1,018,304 produced similar polymers of higher carbon monoxide content in the presence of alkylphosphine complexes of palladium salts as catalyst. Nozaki extended the process to the production of linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of the repeating structure $-CO(A)$ where A is the moiety of the unsaturated hydrocarbon polymerized through the ethylenic unsaturation. For example, when the ethylenically unsaturated hydrocarbon is ethylene, the polymer is of the repeating formula $-CO(CH_2-CH_2)$. The general process for the production of such polymers is illustrated by a number of published European patent applications including 0,121,965 and 0,181,014. The process generally involves the use of a catalyst composition formed from a compound of the Group VIII metals palladium, cobalt or nickel, the anion of a non-hydrohalogenic acid having a pKa below 2 and a bidentate ligand of phosphorus, arsenic or antimony.

The resulting polymers are relatively high molecular weight thermoplastics having utility in the production of shaped articles such as containers for the food and drink industry and parts for the automotive industry. For some particular applications it has been found to be desirable to have properties of a polymeric composition which are somewhat different from those of the polyketone polymer. It would be of advantage to retain the more desirable properties of the polyketone polymer and yet improve other properties. These advantages are often obtained through the provision of a polymer blend.

SUMMARY OF THE INVENTION

The invention contemplates the provision of blends of linear alternating polymers of carbon monoxide and at least one ethylenically unsaturated hydrocarbon with other polymeric material. More particularly, there is provided according to the invention a continuous or partially continuous phase of the linear alternating polymer with a dispersed or partially continuous polymer of alkenyl nitrile, vinyl aromatic and alkadiene monomers. The compositions demonstrate increased modulus and good melt strength in comparison to the linear alternating polymer.

DESCRIPTION OF THE INVENTION

The polyketone polymers which form the continuous or partially continuous phase of the blends of the invention are linear alternating polymers of carbon monoxide and at least one ethylenically unsaturated hydrocarbon. Suitable ethylenically unsaturated hydrocarbons for use as precursors of the polyketones have up to 20 carbon atoms inclusive, preferably up to 10 carbon atoms inclusive, and are aliphatic such as ethylene and other α-olefins including propylene, butylene, isobutylene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or are terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a molecule of the second hydrocarbon, preferably from about 10 units to about 100 units incorporating a moiety of ethylene for each unit incorporating a moiety of the second hydrocarbon. The polymer chain is therefore illustrated by the formula

where B is the moiety obtained by polymerization of the second hydrocarbon through the ethylenic unsaturation. The $-CO(CH_2-CH_2)$ units and the $-CO(B)$ units are found randomly throughout the polymer chain and the ratio of y:x is no more than about 0.5. In the modification of the invention where copolymers are employed the second hydrocarbon is not present and the polymers are represented by the above formula wherein y=0. When y is other than 0, as in the case of terpolymers, ratios of y:x from about 0.01 to about 0.1 are preferred. The end groups or "caps" of the polymer chain will depend on what materials are present during the production of the polymer and whether and how the polymer was purified. The precise nature of the end groups is of little significance with regard to the overall properties of the polymer so that the polymer is fairly represented by the above formula. Of particular interest are the polyketone polymers of molecular weight from about 1,000 to about 200,000, particularly those polyketone polymers of number average molecular weight from about 20,000 to about 90,000 as determined by gel permeation chromatography. The physical properties of such polymers will depend in part on whether the polymer is a copolymer or a terpolymer and the relative proportion of the second hydrocarbon present in the case of terpolymers. Typical melting points of such polymers are from about 175° C. to about 300° C., more preferably from about 210° C. to about 270° C.

A method of producing polyketone polymers which is now becoming conventional is to contact the carbon monoxide and the unsaturated hydrocarbon(s) in the presence of a palladium compound, a non-hydrohalogenic acid having a pKa below about 6 and a bidentate ligand of phosphorus. The scope of the process for the production of polyketone polymer is extensive. Without wishing to be limited, a preferred palladium compound is a palladium carboxylate, particularly palladium acetate, the preferred anion is the anion of trifluoroacetic acid or p-toluenesulfonic acid and the preferred bidentate ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986 (Docket No. K-0722).

Polymerization is conducted under polymerization conditions in the gaseous phase or in a liquid phase in the presence of a reaction diluent such as a lower alkanol, e.g., methanol or ethanol. The reactants and catalyst composition are contacted by conventional means such as shaking or stirring. Suitable reaction temperatures are from about 20° C. to about 150° C. with preferred temperatures being from about 50° C. to about 135° C. Typical reaction pressures are from about 1 bar to about 200 bar, more typically from about 10 bar to about 100 bar. Subsequent to reaction the polymer product is recovered as by filtration or decantation. The polymer product may contain residues of the catalyst which are removed, if desired, by treatment with a solvent or a complexing agent which is selective for the residues.

The polymer which forms the dispersed or partially discontinuous phase of the blends with the polyketones comprises a polymer of an α,β-ethylenically unsaturated alkenyl nitrile of up to 8 carbon atoms inclusive, a vinyl aromatic compound of up to 10 carbon atoms, and an alkadiene of up to 8 carbon atoms inclusive. For convenience, this polymer will be identified as the dispersed polymer although it is understood that the polymer can exist as a partially continuous phase at high concentrations in the blends of the invention.

The α,β-ethylenically unsaturated nitrile used to produce the dispersed polymer is preferably an alkenyl nitrile of the formula

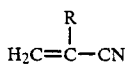

wherein R is hydrogen or alkyl of up to 2 carbon atoms inclusive. These nitriles are acrylonitrile, methacrylonitrile, and ethacrylonitrile. Preferred nitriles of the above formula are acrylonitrile and methacrylonitrile and particularly preferred is acrylonitrile.

The vinyl compound used to produce the dispersed polymer is preferably a vinyl aromatic compound of the formula

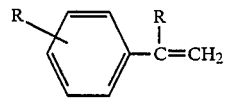

wherein R independently is hydrogen or alkyl of up to 2 carbon atoms inclusive. Illustrative of such vinyl aromatic compounds are styrene, α-methylstyrene, α-ethylstyrene, o-methylstyrene, and p-ethylstyrene. Styrene and α-methylstyrene are preferred vinyl aromatic compounds of the above formula, particularly styrene.

The alkadiene used to prepare the dispersed polymer is preferably a conjugated alkadiene of the formula

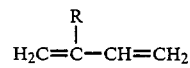

wherein R is hydrogen or alkyl of up to 2 carbon atoms inclusive. Preferred alkadienes are butadiene, isoprene and 2-ethyl-1,3-butadiene. Of these, butadiene is the most preferred conjugated alkadiene.

The alkenyl nitrile, vinyl aromatic, and alkadiene monomers can be combined in a variety of ways to produce the dispersed polymer of the blend. In one modification, the alkenyl nitrile and vinyl aromatic monomers are grafted polymerized upon a backbone of polyalkadiene. In another modification, the alkenyl nitrile and the vinyl aromatic compound are copolymerized to about 70-90% of completion, alkadiene is then added and the polymerization continued. In another modification, copolymers of the alkenyl nitrile and the vinyl aromatic, having less than 40% by weight of the alkenyl nitrile based on the total copolymer, are melt processed with polymerized alkadiene under conditions sufficient to graft some of the poly(alkadiene) to the poly(vinyl aromatic/alkenyl nitrile). The preferred polymer is characterized by polymerized alkadiene being highly dispersed in the alkenyl nitrile/vinyl aromatic polymer matrix and is essentially gel free.

The polymerized alkadiene component of the dispersed polymer is present in an amount of up to about 35% by weight based on the total weight of the dispersed polymer. Preferred quantities of polymerized alkadiene are from about 5% by weight to about 25% by weight on the same basis. The preferred dispersed polymers are produced from acrylonitrile, butadiene, and styrene, and are commercially referred to as ABS polymers. The production of such preferred ABS polymers is illustrated by U.S. Pat. No. 4,287,318. The production of the dispersed polymer is generally well known to persons skilled in the art. Suitable ABS polymers for use in the invention are available from Borg Warner which sells the polymers under the trademark CYCOLAC.

The blends of the invention are predominantly polyketone with a lesser quantity of the alkenylnitrile/alkadiene/vinyl aromatic polymer. The precise percentage of the components to be employed in the blends of the invention is not critical and percentages from about 0.5% by weight to about 50% by weight, based on total blend, of the poly(alkenyl nitrile/alkadiene/vinyl aromatic) are believed to be satisfactory with 0.5% to 35% being the preferred concentration for a truly dispersed phase.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear.

The blends of the invention are non-miscible blends having improved melt strength and high gloss in comparison to the polyketone polymer. The blends will not, of course, be homogeneous but good results are obtained when uniform mixtures of the dispersed phase in the polyketone matrix are obtained.

The blends of the invention may also include conventional additives such as antioxidants and stabilizers, fillers and fire resistant materials, mold release agents, colorants and other materials designed to improve the processability of the polymers or the properties of the resulting blend. Such additives are added by conventional methods prior to, together with or subsequent to the blending of the polyketone and the nitrilic polymer.

The blends are processed by conventional methods such as extrusion and injection molding into sheets, films, plates and shaped parts. Illustrative of such applications are the production of internal as external parts for automotive use.

The invention is further illustrated by the following Illustrative Embodiments which should not be regarded as limiting.

COMPARATIVE EXAMPLE I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 196° C. and the polymer had a limiting viscosity number (LVN) of 1.7 when measured in m-cresol at 60° C. Small amounts of IRGANOX 1076 and IONOL ® antioxidants, which are conventional hindered phenolic antioxidants, were added for stabilization.

The terpolymer was extruded in a twin screw Baker Perkins extruder at 245° C. and 300 rpm then injection molded at 235° C. for measurement of impact strength and room temperature tensile properties. The composition obstructed the injection molding nozzle and measurements of properties were not made.

COMPARATIVE EXAMPLE II

A terpolymer of CO/ethylene/propylene was prepared as described in Comparative Example I with the exception that 0.5% by weight of ETHANOX 330 was added as an antioxidant. Polymer extrusion and molding was conducted at the same conditions except that the extrusion temperature was 250° C. The composition obstructed the injection molding nozzle but did not preclude measurement of properties. The molded sample had a notched Izod impact strength of 3.2 ft. lbs/in. at room temperature, a tangent modulus of 200,000 and other tensile properties as shown in Table I.

ILLUSTRATIVE EMBODIMENT I

A molded sample of a blend of the polyketone polymer of Comparative Example I and 20% by weight (based on total blend) of Borg-Warner's CYCOLAC 3540 ABS polymer was produced with the same procedure as described in Comparative Example II except that the extrusion temperature was 256° C. and the injection molding temperature was 240° C. The polymer blend exhibited increased melt strength, was very easy to mold, and produced molded parts having high gloss in comparison to the polymer blend of Comparative Example II. The molded sample had a notched Izod impact strength of 2.2 ft. lbs/in. at room temperature, a tangent modulus of 215,000 and other tensile properties as shown in Table I.

TABLE I

| Polymer | Room Temperature Tensile Properties | | | |
|---|---|---|---|---|
| | Tangent Modulus | Yield Stress psi | Tensile @ Break,psi | Elongation @ Break, % |
| Comparative Example I | — | — | — | — |
| Comparative Example II | 200,000 | 7,300 | 7,300 | 8 |
| Illustrative Embodiment I | 215,000 | 6,800 | 6,800 | 5 |

COMPARATIVE EXAMPLE III

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 220° C. and the polymer had a limiting viscosity number (LVN) of 2.0 when measured in m-cresol at 60° C. Small amounts of IRGANOX 1076 and IONOL ® antioxidants, which are conventional hindered phenolic antioxidants, were added for stabilization, and 0.5% by weight of ETHANOX 330 was added as an antioxidant.

The terpolymer was extruded in a twin screw Baker Perkins extruder at 245° C. and 300 rpm then injection molded at 240° C. and 900 psi for measurement of impact strength and room temperature tensile properties. The molded sample had a notched Izod impact strength of 3.9 ft. lbs/in. at room temperature, a tangent modulus of 190,000 and other tensile properties as shown in Table II.

ILLUSTRATIVE EMBODIMENT II

A molded sample of a blend of the polyketone polymer of Comparative Example III and 20% by weight (based on total blend) of Borg-Warner's CYCOLAC 3540 ABS polymer was produced with the same procedure as described in Comparative Example III except that the extrusion temperature was 255° C. and the injection molding pressure was 1500 psi. The polymer blend exhibited increased melt strength in comparison to the polymer blend of Comparative Example III. The molded sample had a notched Izod impact strength of 1.8 ft. lbs/in. at room temperature, a tangent modulus of 220,000 and other tensile properties as shown in Table II.

ILLUSTRATIVE EMBODIMENT III

A molded sample of a blend of the polyketone polymer of Comparative Example III and 40% by weight (based on total blend) of Borg-Warner's CYCOLAC 3540 ABS polymer was produced with the same procedure as described in Comparative Example III except that the extrusion temperature was 255° C. and the injection molding pressure was 1200 psi. The polymer blend exhibited increased melt strength in comparison to the polymer blend of Comparative Example III. The molded sample had a notched Izod impact strength of 1.2 ft. lbs/in. at room temperature, a tangent modulus of 225,000 and other tensile properties as shown in Table II.

ILLUSTRATIVE EMBODIMENT IV

A molded sample of a blend of the polyketone polymer of Comparative Example III and 60% by weight (based on total blend) of Borg-Warner's CYCOLAC 3540 ABS polymer was produced with the same procedure as described in Comparative Example III except that the extrusion temperature was 250° C. and the injection molding pressure was 800 psi. The polymer blend exhibited poor mold strength in comparison to the polymer blend of Comparative Example III. The molded sample had a notched Izod impact strength of 1.8 ft. lbs/in. at room temperature, a tangent modulus of 230,000 and other tensile properties as shown in Table II.

TABLE II

| | Room Temperature Tensile Properties | | | |
|---|---|---|---|---|
| Polymer | Tangent Modulus | Yield Stress psi | Tensile @ Break, psi | Elongation @ Break, % |
| Comparative Example III | 190,000 | 8,400 | 9,800 | 311 |
| Illustrative Embodiment II | 220,000 | 7,800 | 6,800 | 94 |
| Illustrative Embodiment III | 225,000 | 7,100 | 6,200 | 108 |
| Illustrative Embodiment IV | 230,000 | 6,900 | 5,800 | 39 |

What is claimed is:

1. A composition comprising:
   a linear alternating polymer of carbon monoxide and at least one ethylenically unsaturated hydrocarbon; and
   a second polymer of a vinyl aromatic monomer, an α,β-ethylenically unsaturated alkenyl nitrile, and a conjugated alkadiene, the alkadiene being present in an amount less than about 35% by weight of the second polymer which is present in an amount between about 0.5% and about 50% by weight of the composition.

2. The composition of claim 1 wherein the linear alternating polymer is represented by the formula

wherein B is the moiety of an ethylenically unsaturated hydrocarbon of at least 3 carbon atoms and the ratio of y:x is no more than about 0.5.

3. The composition of claim 2 wherein the α,β-ethylenically unsaturated alkenyl nitrile is of the formula

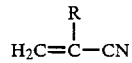

wherein R is hydrogen or alkyl of from 1 to 2 carbon atoms inclusive, and the vinyl aromatic compound is of the formula

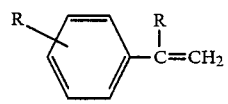

wherein R independently is hydrogen or alkyl of from 1 to 2 carbon atoms inclusive.

4. The composition of claim 3 wherein the alkenyl nitrile is acrylonitrile, the vinyl aromatic monomer is styrene, and the conjugated alkadiene is butadiene.

5. The composition of claim 2 wherein y is zero.

6. The composition of claim 2 wherein B is a moiety of propylene and the ratio of y:x is from about 0.01 to about 0.1.

7. The composition of claim 1 wherein the second polymer is present as a dispersed phase.

8. The composition of claim 7 wherein the alkadiene is present in an amount of from about 5% by weight to about 25% by weight, based on the weight of the second polymer.

9. The composition of claim 1 wherein the linear alternating polymer is produced by reacting the carbon monoxide and the ethylenically unsaturated hydrocarbon in the presence of a catalyst composition comprising a palladium compound, a non-hydrohalogenic acid having a pKa below about 6, and a bidentate ligand of phosphorus.

10. The composition of claim 9 wherein the bidentate ligand is 1,3-bis[di(2-methoxyphenyl)phosphino]propane.

* * * * *

| | Particle size [mm] | | | | | |
|---|---|---|---|---|---|---|
| | <0.125 | 0.125–0.250 | 0.250–0.5 | 0.5–1.0 | 1.0–2.0 | >2.0 |
| Example | 0 | 0.9 | 61.4 | 35.2 | 1.7 | 0.8 [% wt.] |
| Comparative Experiment | 0.2 | 3.9 | 41.8 | 28.8 | 13.5 | 1.8 |